United States Patent [19]

Strauss

[11] 4,117,499
[45] Sep. 26, 1978

[54] PHOTOGRAPHIC CAMERA WITH AUTOMATIC EXPOSURE CONTROL

[75] Inventor: Karl-Peter Strauss, Volkmarode, Germany

[73] Assignee: Rollei-Werke Franke & Heidecke, Braunschweig, Germany

[21] Appl. No.: 770,849

[22] Filed: Feb. 22, 1977

[30] Foreign Application Priority Data

Feb. 25, 1976 [DE] Fed. Rep. of Germany ....... 2607544
Feb. 25, 1976 [DE] Fed. Rep. of Germany ....... 2607589
Feb. 25, 1976 [DE] Fed. Rep. of Germany ....... 2607615

[51] Int. Cl.$^2$ ............................................... G03B 7/08
[52] U.S. Cl. ................................. 354/23 D; 354/60 A
[58] Field of Search ............................ 354/23 D, 60 A

[56] References Cited

U.S. PATENT DOCUMENTS 3,899,788  8/1975  Toyoda ............................. 354/23 D

FOREIGN PATENT DOCUMENTS 2,316,261 10/1974 Fed. Rep. of Germany ........ 354/23 D
2,319,167 10/1974 Fed. Rep. of Germany ........ 354/23 D

OTHER PUBLICATIONS

The TTL Data Book, Texas Instruments, Data for 74LS138, pp. 7-134 to 7-137.

*Primary Examiner*—Russell E. Adams
*Attorney, Agent, or Firm*—Stonebraker, Shepard & Stephens

[57] ABSTRACT

Electronic circuitry for setting or controlling either one of two exposure value factors of a photographic camera, namely, the exposure time (shutter speed) and the diaphragm aperture. The circuitry includes a comparator which receives an input responsive to the film sensitivity, the brightness of the subject, and the preset selected value of the one of the two exposure factors which is to be set manually rather than automatically. The comparator is connected to a flip-flop, a counter, and a decoder in such a way as to provide a signal which can control or operate either a photographic shutter mechanism or a diaphragm aperture mechanism, and the signal also controls the lighting of luminous diodes to give a visual indication of the exposure factor value which has been determined by the circuit as the proper value for an optimum exposure. There is also provision for storing the determined exposure value for later use.

34 Claims, 6 Drawing Figures

PHOTOGRAPHIC CAMERA WITH AUTOMATIC EXPOSURE CONTROL

BACKGROUND OF THE INVENTION

This invention relates in general to a photographic camera having a device for converting an exposure control signal into a mechanical setting of one exposure value factor, such as the setting of the diaphragm aperture, or into a setting of another exposure value factor, such as the time of release of the closing movement of a shutter, thereby determining the duration of the exposure or what is often referred to as the shutter speed.

One aspect of the invention relates to electronic circuit means for producing a first analog signal responsive to the film sensitivity and to the exposure value factors (shutter speed or exposure time, and diaphragm aperture) introduced either manually or automatically in consideration of the brightness of the subject being photographed, and a reversible n-bit counter, a digital-analog converter for delivering a second analog signal corresponding to the respective digital counter output combination, an apparatus for the forward stepping of the counter step by step in a first counting direction, when the second analog signal is smaller than the first, and in the opposite counting direction when the second analog signal is greater than the first, and having a decoder connected to the counter.

Another aspect or feature of the invention relates to the storage of an electric signal produced in analog form, especially an analog signal representing the brightness of the subject to be photographed, in an exposure control circuit for photographic cameras.

Still another feature or aspect of the invention relates to a device for indicating the exposure value in a photographic camera, in which the exposure value is introduced as an analog electric signal, either by hand or by an automatic circuit, the indicating device having a luminous diode line arranged preferably in the viewfinder of the camera, with each luminous diode connected with one output of a decoder actuated by a digital counter.

One known camera of this general kind is disclosed in German offenlegungsschrift (published patent application) no. 2,417,999, published Oct. 24, 1974 which corresponds to U.S. Pat. No. 3,899,788, granted Aug. 12, 1975. In the camera disclosed in this German application, the decoder serves exclusively for the digital indication of the value counted into the counter, while the second analog signal taken from the output of the digital analog converter is used for the exposure time control. This second analog signal is, however, logarithmically compressed, for in order to be able to cover the entire brightness range of a camera with acceptable expense for the control circuit, the signal voltage representative of the subject brightness is always made proportional to the logarithm of the subject brightness. In order that this logarithmic analog signal may be used as an exposure control signal, its anti-logarithm must be found, which takes place in a so-called anti-log circuit preceding the exposure time-control device. However the finding of the anti-logarithm of an analog signal raises several serious problems, since such an anti-log or de-logarithmation circuit, which in the known camera consists of the series connection of a transistor and at least one diode, is intensely temperature-dependent. This has the consequence that in the case of temperature variation the exposure time indication which is carried out through the decoder and which therefore is temperature-independent, indicates a value other than that with which the shutter time is formed. Moreover it requires an expensive temperature-compensation circuit in order that an exact exposure control may be achieved in the temperature range from minus 10° to plus 50° C. required ordinarily by a camera. Such a temperature compensation however can be mastered only with difficulty in the mass production of the camera.

One feature of the present invention is therefore based upon the problem of developing a camera of the stated kind, while avoiding the stated disadvantages, so that the finding of the anti-logarithm of an analog signal for exposure or diaphragm control is avoided, and thus temperature compensation becomes superfluous. Furthermore such a measure is to be carried out with minimum possible expense.

SUMMARY OF THE INVENTION

According to this feature of the present invention, this problem is solved by forming the decoder as an $n$-1 to $2^{n-1}$ decoder, whose $n$-1 inputs are each connected to one of the counter outputs with the exception of the first bit output of the counter, and whose $2^{n-1}$ outputs are each connected with a resistor, the resistance values of which are graduated in a specific relationship to one another. All these resistors are connected together at a common connection point, from which the control signal can be obtained for the converter device for the exposure time control or diaphragm control.

In this way, the finding of the anti-logarithm is effected not of an analog but of a digital signal, and the digital signal is converted into an analog control signal for the exposure time or diaphragm control only after the finding of the anti-logarithm. Due to the fact that the decoder is formed as an $n$-1 to $2^{n-1}$ decoder and the first bit output of the counter is not decoded, the object is achieved that the digital-analog converter placed after the decoder in the form of a resistance network can be made with relatively few components. Due to the alternation of the counter at the balance point, that is when the analog signal taken in the first digital-analog converter corresponds approximately to the first analog signal, one output of the decoder or alternatingly two adjacent outputs of the decoder will always be occupied with a signal. This means that each of the resistors connected to the decoder outputs participates in the formation of three different exposure value stages, with the exception of the resistors connected to the first and last decoder outputs, which participate only in the formation of two exposure value stages.

Accordingly by way of example with a 3 to 8 decoder and a digital-analog converter of eight resistors, it is possible to form 15 exposure value stages, which signifies a saving of nearly half the resistors in comparison with a conventional digital-analog converter. At the same time the possibility is also obtained of reducing the extent of the components for the indication of these exposure value stages by nearly half, in that according to a further development of the invention the decoder outputs are each connected with an optical indicator element, preferably a luminous diode. Here again by the alternation of the counter at the balance point — as also the resistors — each luminous diode participates three times in the indication of adjacent exposure value stages, obviously again with the exception of the two luminous diodes connected to the first and last decoder outputs, which participate only in the indication of two exposure values. At the one exposure value stage in each case one luminous diode lights up alone, at the next exposure value stage the two adjacent luminous diodes light up simultaneously, and so forth. As a whole, here again for example with eight luminous diodes a total of 15 different exposure value stages can be indicated.

According to a preferred example of the invention the counter comprises a timing pulse input connected to a pulse generator and an input (up/down) for determining the counting direction of the counter, which is connected with the input of a comparator comparing the two analog signals.

Over a lengthy time period this control signal tapped from the common connection point of the resistors connected to the decoder can be maintained over a time period of infinite length, if in accordance with a further development of the invention a device is provided for the over-riding of the up/down input of the counter with an alternating signal which constantly reverses the counting direction of the counter. This device can be realized especially advantageously by a D-flip-flop, whose Q output is connected to the up/down input of the counter and whose Q output is connectable through a switch with the D-input of the flip-flop connected to the comparator output. The switch can be made as a transistor or a logic gate and can be closed manually, for example by pressing of what is called a "memo" key. As long as this exposure control signal is maintained, this control signal is also indicated in the line of luminous diodes.

In a camera with an automatic exposure time control system, the device for converting the exposure control signal into a time-delayed release of the closure movement of the camera shutter expediently comprises an integration capacitor which is connected to a comparator equipped with a reference voltage, and the output of which controls a magnet for the release of the closure movement of the camera shutter.

In such an exposure time control system, the settable exposure time stages can be doubled by a simple measure which is inexpensive in circuitry, while the decoder and the resistance network connected to the decoder for digital-analog conversion can be retained unchanged. According to this feature of the invention, the inverse counter receives a further output for an $n + 1$ bit, which is connected with the digital analog converter connected to the counter outputs and controls a transistor in series with a second integration capacitor. The series connection of the second integration capacitor and transistor lies parallel with the first integration capacitor. By connection and disconnection of the additional integration capacitor it is possible with the same decoder and the same resistance network to form two different exposure time groups, so that for example in the case of a 3 to 8 decoder and a corresponding resistance network of 8 parallel-connected resistors, it is possible to form 32 time stages from an exposure time of 16 to 1/2000 sec.

Taking consideration of the progressive graduation of the resistance values of the resistors of the network connected to the decoder, the transistor is expediently made as an npn-transistor, and the $n + 1$ bit output of the counter is connected through an inverter with the base of the transistor. Likewise by this last described measure with equally low expense, double the number of settable exposure times can be displayed with only slight expense. According to a further development of the invention, this is achieved by providing a second luminous diode line, the luminous diodes of which are each connected with a decoder output. The output of the first and second luminous diode lines are each connected through a transistor with the negative potential. The base of the transistor controlling the first luminous diode line is connected through an inverter and the base of the transistor controlling the second luminous diode line is connected directly with the $n + 1$ bit counter output.

As above indicated, another one of the main features or aspects of the invention relates to an arrangement for the storage of an electric signal issued in analog form, especially an analog signal representative of the brightness of a subject to be photographed, in an exposure-control circuit for photographic cameras, such circuit having a reversible pulse counter, a digital-analog converter to supply a second analog signal corresponding to the respective digital counter output combination, and an apparatus for the forward stepping of the counter step by step in a first counting direction when the second analog signal is less than the first, and in the opposite counting direction when the second analog signal is greater than the first.

In such arrangements, which are used especially for exposure measurement and automatic exposure control in photographic cameras, this second analog signal, which after the conclusion of brightness measurement corresponds to the first analog signal representative of the measured brightness, is utilized for the automatic control of the exposure time of the camera. The conversion of the first analog signal representative of the subject brightness, through a digital counter and a digital-analog converter, into a second analog signal identical with the first, takes place for the reason that in a simple manner it may be possible to store the brightness value of the subject to be photographed, measured at a specific moment in time, over as long a time as desired even if the first analog signal should vary as a result of the variation of the subject brightness or as a result of shading of the light sensor, for example due to swinging up of the mirror in a mirror reflex camera and TTL (through the lens) measurement immediately before the actual shutter release. Moreover with such possibilities of storage it is possible to carry out so-called counter light corrections in cameras with automatic exposure-control circuits, due to the fact that for example one measures a darker part, stores this value and with the stored exposure value carries out the exposure of the subject situated in the counter light.

In a known circuit for brightness measurement of a subject to be photographed, as disclosed in the above mentioned German Pat. No. 24, 17, 999, for the storage of the analog signal representative of the brightness for the duration of the storage, the connection of the pulse generator with the pulse counter is interrupted, so that as a result of the absence of pulses the state of the counter cannot vary. Thus the second analog signal serving for the control of the exposure time remains constant, even if the brightness of the subject and thus the first analog signal should vary.

If here the apparatus for stepping the counter onward in opposite counting directions has no dead zone, due to the fact that the second analog signal varies only in discrete stages as a result of only digitally present counter combinations for which it is representative, at the balance point of the two analog signals the second analog signal will always be smaller or larger than the first output signal, so that the counter adds and subtracts, whereby the second analog signal again becomes larger or smaller than the first analog signal and the counter now subtracts or adds, whereby the second analog signal again becomes smaller or larger than the first analog signal and so forth. This means that at the balance point the counter alternates between two successive discrete stages and thus the second analog signal also alternates between two discrete values.

If now for the purpose of storage, the pulse generator is separated from the counter, in each case only that condition of the counter is retained in which the counter is situated at the moment of separation of the generator. The retained second analog signal thus no longer alternates, but is either larger or smaller than the first analog signal representative of the brightness, present at the moment of storage. The second analog signal, which before the storage due to alternation between two discrete values and the thus effected means value formation corresponded to the first analog signal with a maximum error of a half bit or a half light value (ordinarily the circuits are so designed, in order to keep the electronic expense within tolerable limits, that in each case one bit corresponds to one light value), then the error caused by the storage between the first analog signal representative of the brightness and the second analog signal representative of the first analog signal amounts to one bit at maximum, which corresponds to one light value or three DIN stages. Thus due to the storage an over-exposure or under-exposure of the photographic image occurs in the order of magnitude of one light value, which is not acceptable in the case of cameras of high quality intended for making high quality photographs.

If it is desired to avoid this, the provision of a dead zone in the apparatus for the reversible onward stepping of the stepping switch is absolutely necessary, so that this apparatus by reason of its dead zone gives a pulse to the counter only when the difference between the first and second analog signals corresponds to at least one half bit or one half of a light value. For this purpose the dead zone logically must be so designed that it amounts to one exposure value stage, that is to say it covers one half exposure value stage downwards and one half exposure value stage upwards. Only then, if the first analog signal does not correspond exactly to one of the predetermined discrete stages of the second analog signal, can the occurrence of the alternation of the second analog signal between two adjacent stages be avoided and a constant second analog signal always be obtained. However, in the determination of the dead zone of the apparatus for the stepping of the pulse counter in reversible counting directions, which must be effected through the dimensioning of its components, the tolerance of these components has a very great effect, so that without great expense this desired dead zone cannot be maintained exactly. Then likewise inaccuracies in the exposure control are the consequence.

Furthermore, the alternation of the counter between two conditions occurring at the balance point of the two analog signals provides the possibility of carrying out an analog exposure control and the associated indication, for the same number of discreted exposure stages to be covered, set and indicated, with substantially lower expense for electronic circuit components. Thus for example for an $n$-bit counter, which renders it possible to divide up the entire exposure range into $2^n$ exposure stages and to control the exposure in these discrete stages, it is necessary to have only an $n$-1 to $2^{n-1}$ decoder and only a resistance network of $2^{n-1}$ resistors forming a digital-analog converter, at whose common connection point the analog signal can be tapped for the exposure control. This is because every decoder output and every resistor always participate in the formation of two exposure stages in each case, once alone and once with the adjacent decoder output and resistor respectively. Thus with $2^{n-1}$ resistors it is possible to form $2^n$-1 exposure stages. For the indication of these $2^n$-1 exposure stages, in accordance with the $2^{n-1}$ decoder outputs, only $2^{n-1}$ luminous diodes are also necessary, that is almost only half of the outerwise required luminous diodes. In order, however, to be able to utilize these advantages even in single-lens mirror reflex cameras with TTL measurement, admittedly the circuit must be designed so that alternating signals representative of the brightness measurement can not only be produced for exposure control, but they can also be stored as alternating signals.

In order to be able to avoid the above described disadvantages and to utilize the above described advantage, the invention deals with the problem of producing an arrangement for the storage of an electric signal issued in analog form, of the above stated kind, in which an alternating second analog signal representative of the electric signal to be stored, or a representative alternating state of the pulse counter, is maintained unchanged over the entire duration of storage.

According to the present invention this problem is solved by a device which can be switched on for the duration of the storage, for the over-riding of the counter input connected with the counter stepping device with an alternating signal effecting a constant switching over of the counting direction of the counter. Due to this over-riding the signal arriving at the counter-input from the counter stepping device has no influence upon the state of the counter, so that during the storage the first analog signal can vary as desired and nevertheless the alternating analog signal retained at the moment of storage can be tapped from the output of the digital-analog converter over as long a time period as desired. Further expedient realizations and further developments of the invention are set forth in greater detail in the following description.

It has been noted above that still another feature or aspect of the invention relates to a device for indicating the exposure value (exposure time and/or diaphragm stop) in a photographic camera, in which the exposure value is introduced as an analog electric signal by hand into an exposure control circuit and/or ascertained automatically by this circuit, having a luminous diode line arranged preferably in the camera viewfinder, in which each luminous diode is connected with one output of a decoder actuated by a digital counter.

Indicator devices for the exposure value are known in two variants. In the first variatnt, the luminous diodes of a luminous diode line are each actuated through a threshold-value switch and light up selectively when the voltage level of the electric signal arriving at the threshold-value switch and representing the exposure value exceeds the threshold value in each case. In the case of the other type of indicator device, each luminous diode of a luminous diode line is connected with one output of a decoder. The decoder in turn is actuated by a digital counter to which the exposure value signal is fed as a difital value, preferably as a specific number of pulses. The binary combination present at the counter outputs according to the detected exposure value is thus fed to a specific luminous diode which lights up and signals the corresponding exposure value.

In both cases it is necessary to arrange in a luminous diode line as many luminous diodes as the number of different exposure values which are to be indicated. If the luminous diodes are expediently arranged in the camera viewfinder, then by the space conditions existing here the number of luminous diodes to be accommodated is very limited, and despite the exposure value setting in discrete stages with very small intervals one must limit oneself to a selection of the exposure values to be indicated. If for example the exposure control circuit is capable of effecting an exposure value setting in 32 discrete exposure value stages, in no way can these 32 different exposure values be indicated in the viewfinder, since construction space for 32 luminous diodes is not available, if one adopts the basis of the dimensions of the luminous diodes at present available on the market.

The invention aspect or feature now being discussed deals with the problem of producing a device for indicating the exposure value in which, with a predetermined number of luminous diodes, almost twice the number of exposure values can be indicated.

According to the present invention this problem is solved by using a reversible $n$-bit digital counter, a digital-analog converter for supplying a second analog signal corresponding to the respective counter output combination, an apparatus for stepping the counter onwards step by step in a first counting direction when the second analog signal is smaller than the first and in the opposite counting direction when the second analog signal is greater than the first, and an $n$-1 to $2^{n-1}$ decoder, the inputs of which are each connected to a counter output with the exception of the first bit output of the counter.

By this circuit arrangement the object is achieved that every second exposure value stage is indicated by the successive luminous diodes and the intervening exposure value stages are signalled by simultaneous lighting up of two adjacent luminous diodes. In this way it is possible with $m$ luminous diodes to indicate $2^{m-1}$ exposure value stages, that is, approximately double the number of exposure value stages.

Furthermore with the device according to the invention as mentioned above, the further advantage is obtained that the exposure value signals present at the output of the decoder can be used directly for the setting of the diaphragm stop or exposure time. It is here also essential that due to the fact that the signals occurring at the outputs of the decoder are analog signals, it is possible to use the conventional technique for converting these signals into a mechanical setting of the diaphragm stop or of a corresponding delay of the closure operation of the shutter. Even in the case of digital ascertainment of the requisite exposure value, this indicator device can be used to effect the diaphragm setting or form the exposure time directly, without additional digital counters and decoders being necessary.

A preferred embodiment of this part of the invention is distinguished by a comparator whose one input is occupied with the analog signals coming from the digital-analog converter, and whose other input is occupied with the exposure value signal, and whose output is connected to the up/down input (up/down selector) of the counter.

An especially simple assembly of the digital-analog converter is achieved according to a further development of the invention in that the counter outputs are united, each through a resistor, at a common connection point which is connected with the one input of the comparator, and in that the resistance values of the resistors are graduated in progressive sequence in a specific ratio to one another. In this way, with the up/down counter running continuously, a staircase voltage occurs at the connection point, each step of the staircase representing a settable exposure value stage.

DESCRIPTION OF THE PREFERRED EMBODIMENTS

Figure 1:
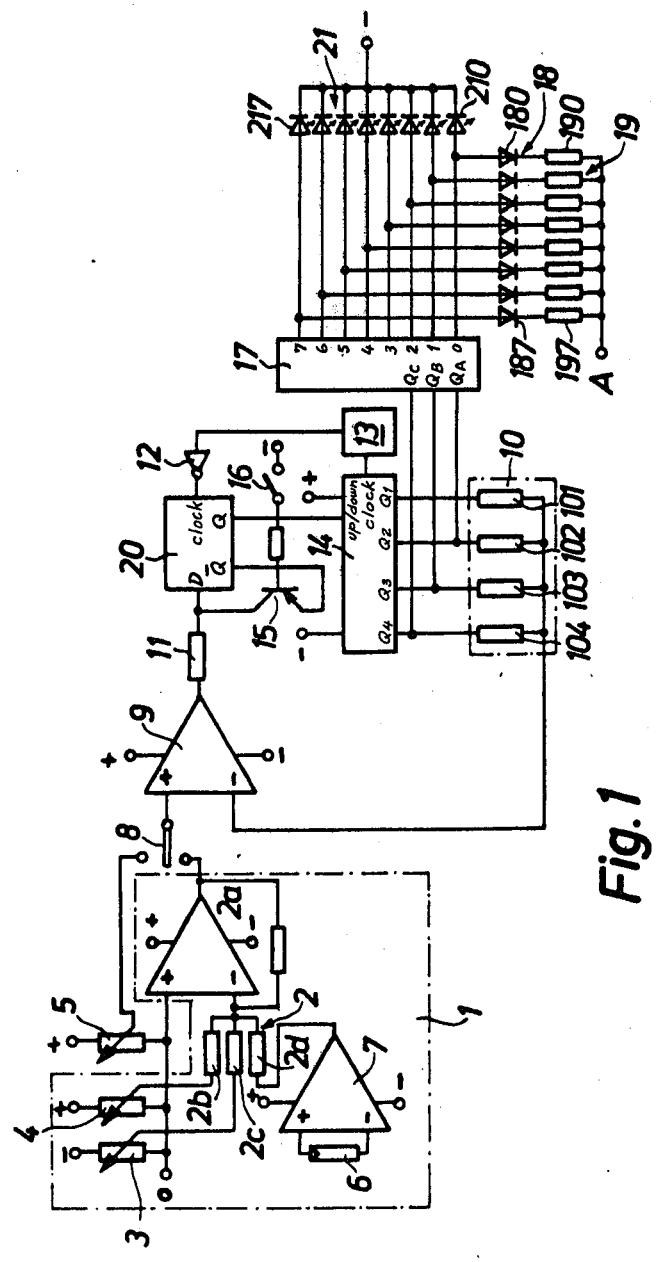
FIG. 1 is a schematic circuit diagram illustrating a major portion of the circuitry according to a preferred embodiment of the invention.

Referring now to FIG. 1, an electronic circuit arrangement for automatically determining one of the variable exposure value factors in a photographic camera is indicated in general at 1. This circuit can be used to determine either the factor of exposure time (shutter speed) or the factor of diaphragm aperture necessary for optimum exposure in accordance with the prevailing subject brightness. This circuit arrangement comprises an analog computer or adder 2 which consists of the operation amplifier 2a and the input resistors 2b, 2c, and 2d.

The non-inverting input of the operation amplifier 2a lies at the center potential, designated by "O", of a direct-current voltage source feeding the entire electric circuit. The positive pole of this direct-current voltage source is designated by "+" and the negative pole by "−". Between this center potential and the positive and negative potentials of the direct-current voltage source there are connected three potentiometers 3, 4, and 5. The potentiometer 3 serves for the setting of the film sensitivity.

In a camera with automatic timing, that is to say automatic ascertaining of the exposure time (shutter speed) from predetermined diaphragm stop or aperture, film sensitivity, and subject brightness, the diaphragm stop is preselected by means of the potentiometer 4, and for manual as distinguished from automatic selection of the exposure time, the desired exposure time is predetermined with the potentiometer 5. In a camera with automatic diaphragm, that is to say the automatic ascertaining of the requisite diaphragm aperture from introduced exposure time, film sensitivity, and subject brightness, the time is preselected by means of the potentiometer 4 and in manual operation of the camera the desired diaphragm stop is set by means of the potentiometer 5. The potentiometer tappings of the potentiometers 3 and 4 are connected with the adding input of the analog computer 2, to which a photoelectric converter 6 measuring the subject brightness is also connected through an amplifier 7. The potentiometer tapping of the potentiometer 5 and the output of the operation amplifier $2a$ are connected to the two inputs of a changeover switch 8. This changeover switch serves to convert the camera from automatic to manual operation. In the case of manual operation the changeover switch 8 connects the tapping of the potentiometer 5 with the non-inverting input of a comparator 9, and in automatic operation of the camera the changeover switch 8 connects the output of the analog computer 2 with this non-inverting input of the comparator 9. This inverting input of the comparator 9 is connected with the output of a digital analog converter 10 which consists of $n$ parallel-connected resistors 101 to $100n$, the significances in the present example being $n = 4$, $100n = 104$. The common connection point of these resistors represents the output of the digital-analog converter.

The output of the comparator 9 is connected through a resistor 11 to the input of a D-flip-flop 20. The clock input of the D-flip-flop is connected through an inverter 12 to a timing or pulse generator 13, which may be of conventional construction. The output of this timing generator is also connected with the clock input of an $n$-bit up/down counter 14, where in the present example again $n = 4$. The Q-output of the D-flip-flop 20 is connected with the up/down control input (up/down selector) of the counter 14, while the Q-output of the D-flip-flop is connected through the emitter-collector path of a pnp-transistor 15 with the D-input. The base of the transistor 15 is connectable by means of a switch 16 to negative potential whereby the transistor 15 becomes conductive. The switch 16 can either be closed by the mirror movement in swinging the reflex mirror of the camera up into the picture-taking position, or can be connected with a "memo" key (not shown).

The Q-outputs $Q_1$ to $Q_n$ with $n = 4$ of the up/down counter 14 are each connected with a resistor 101 to 104 of the digital-analog converter 10. Moreover the outputs $Q_2$ to $Q_n$, in the present example again $Q_2$ to $Q_4$, are connected with an $n$-1 to $2^{n-1}$ decoder 17, that is in the present example a 3 to 8 decoder. The first bit output $Q_1$ of the counter is the only one not connected to the decoder. The eight outputs of the decoder are each connected through a decoupling diode 180 to 187 with a resistor 190 to 197, so that in all there are $2^{n-1}$ - decoupling diodes and $2^{n-1}$ resistors. The resistors are connected in parallel with one another, and the common connection point A is connected to an electromechanical device for converting the exposure control signal into a mechanical setting of the diaphragm stop (as further explained in connection with FIG. 3) or into a time-delayed release of the closure movement of the camera shutter (as further explained in connection with FIG. 2).

Furthermore, each output of the decoder 17 is connected to the anode of a separate luminous diode 210 to 217 of a luminous diode line or group 21. The cathodes of the luminous diodes are all connected to minus potential.

Figure 2:
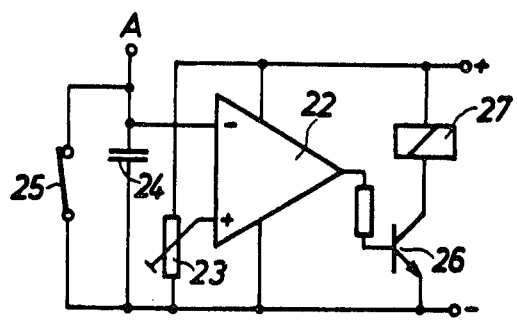
FIG. 2 is a schematic circuit diagram of additional circuit parts to be used in conjunction with the circuit of FIG. 1 when signals produced by the circuit of FIG. 1 are to be used for setting or controlling the exposure time or shutter speed.

An electromechanical converter device for the exposure control signal in the exposure time control system is shown in FIG. 2. It comprises a comparator 22, the non-inverting input of which is connected to an adjustable resistor 23. The inverting input of the comparator is connected with the plate of an integration capacitor 24 which is connected to the point A of the resistance network 19 shown in FIG. 1. The other plate of the capacitor is connected to negative potential. A switch 25 which ensures the discharge of the capacitor and is opened during the exposure time formation is connected in parallel with the integration capacitor 24. The output of the comparator 22 is connected with the base of a transistor 26 which is connected to the direct-current voltage source in series with the solenoid of a magnet 27 which releases the shutter curtain or otherwise controls the start of the closing movement of the shutter, thus in effect determining the exposure time or shutter speed.

Figure 3:
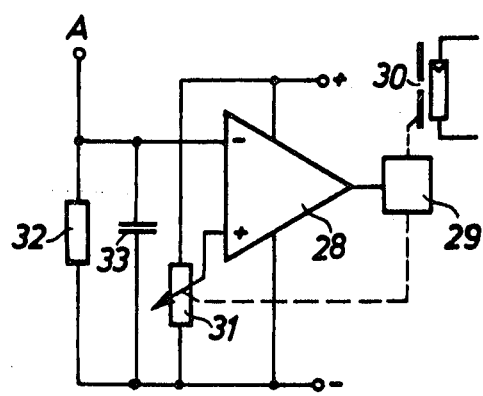
FIG. 3 is a schematic circuit diagram of additional circuit parts to be used in conjunction with the circuit of FIG. 1 when the signals produced by the circuit of FIG. 1 are to be used for setting or controlling the diaphragm stop or aperture.

If the exposure factor control signal derived from the circuit shown in FIG. 1 is to be used to control the diaphragm aperture rather than the exposure time, one may use the system represented in FIG. 3. Here, the output of a comparator 28 is connected with a electric motor drive system 29 for the diaphragm 30. At the same time the electric motor drive system 29 displaces the slider of a potentiometer 31. The slider of the potentiometer 31 is connected with the non-inverting input of the comparator 28, the inverting input of which is connected with a resistor 32 lying between the connection point A of the resistance network 19 (FIG. 1) and negative potential. A smoothing capacitor 33 is also connected in parallel with the resistor.

The operation of the exposure control circuit will be described with reference to an exposure time-control system in connection with FIGS. 1 and 2: The film sensitivity is set on the potentiometer 3, and the manually selected diaphragm stop or aperture is set on the potentiometer 4. The photoelectric converter 6, receiving light reflected from the subject being photographed, ascertains the subject brightness. These three electric signals from the potentiometer 3, the potentiometer 4, and the converter 6 are processed in the analog computer 2 and produce at the output thereof an electric signal which corresponds to the exposure time to be formed.

If the changeover switch 8 stands at automatic operation, this signal lies as reference potential on the non-inverting input of the comparator 9. (In the case of manual operation the time to be formed is given, through the potentiometer 5 and the changeover switch 8 standing in the "manual" position, as an electric signal directly to the non-inverting input of the comparator 9.) The timing pulses of the timing generator 13 pass to the clock input of the computer 14. Each positive flank of these pulses steps the counter 14 further by one counting stage. Through the resistors 101 and 104, whose resistance value is in inverse proportion to the value of the respective output, rectangular signals are formed which are brought together at the connection point of the resistors. With the counter running continously, there will be at this connection a staircase voltage of $2^n$ stages; that is, sixteen stages in the present example with four counter outputs. The comparator 9 compares the analog staircase signal at this connection point of the resistors with the time signal of the non-inverting input of the comparator 9, the output signal of the comparator passes to the D-input of the flip-flop 20, whose timing signal is inverse to the timing signal of the counter 14. With the positive flank of the inverse timing pulse, that is with the negative flank of the timing pulse of the pulse generator 13, the Q-output takes over the information of the D-input.

As long as the analog staircase signal and the time signal present on the non-inverting input of the comparator 9 are different, the output of the operation amplifier and thus the Q-output of the flip-flop do not change. The counter 14 retains its counting direction, that is to say the counter adds or subtracts. Let it be assumed that the counting direction at first is upward, that is adding, which signifies that the signal at the inverting input is less than at the non-inverting input of the comparator 9. If now the analog staircase signal exceeds the time signal, the output of the operation amplifier 9 becomes negative, which takes place with forward stepping of the counter, that is with the positive flank of the timing pulse. With the negative flank of this timing pulse the Q-output of the flip-flop 20 takes over the information of the comparator output and switches the counter to "down." The next timing pulse is then counted downward by the counter 14, that is subtracted, whereby the analog staircase signal again becomes smaller than the electric time signal. The output of the operation amplifier again becomes positive. The information is taken over by the Q-output of the flip-flop 20, and this switches the counter to "up" so that the next pulse is added again. Thus the counter alternates constantly between these two positions and the output voltage, thus alternating between two values, of the digital-analog converter 10 is a measure for the exposure time ascertained by the computer.

By closure of the switch 16 this value can be stored as long as desired. With the switch 16 closed the transistor 15 is conductive and connects the Q-output of the D-flip-flop 20 in low-impedance manner with its D-input. The signal coming through the resistor 11 from the operation amplifier 9 is over-ridden with the Q-signal of the D-flip-flop, whereby the signal at the q-output of the D-flip-flop constantly alternates. Thus the alternating condition is maintained at the up-down input of the counter 14, even if the subject brightness on the photoelectric converter 6 varies. The storage is maintained as long as desired with unchanged accuracy.

The time formation is effected by charging of the integration capacitor 24 (FIG. 2) to a threshold value, namely through the output or outputs of the decoder 17 just conducting positive potential. The decoupling diodes 180 to 187 (FIG. 1) prevent the current from being able to flow to decoder outputs conducting negative potential. The resistance network 19 consisting of the resistors 191 to 195 is so dimensioned that the resistance paths of the individual decoder outputs to the integration capacitor 24 possess a stagger of 2:1 from decoder output to decoder output. If the voltage on the integration capacitor 24 reaches a level adjustable with the adjustable reference resistor 23, the output of the comparator 22 becomes positive and the transistor 26 becomes conductive, whereby the solenoid of the shutter magnet 27 is energized and the magnet releases the shutter for the closure movement. The time which is required for the charging of the capacitor 24 to this voltage level through the corresponding resistance path corresponds to the desired shutter time, i.e., the exposure time. So that the capacitor is exactly discharged at the beginning of time formation, it is constantly short-circuited by the switch 25 which is opened at the beginning of the shutter opening. Hence this circuitry accurately determines the exposure time or interval from commencement of opening the shutter to the commencement of closing movement resulting from energizing the electromagnet 27.

Since the first bit output of the counter 14 is not decoded, in the case of specific counter output combinations, two outputs of the decoder lying side by side alternately conduct positive potential. This signifies that the integration capacitor 24 is charged up alternately through two resistance paths lying side by side, namely through the one in one half time unit and through the other resistance path in the other half time unit. In this way it is possible in the present example with the eight resistance paths to form fifteen different exposure times. (In the case of $n$ resistance paths, there would be correspondingly $2n - 1$ exposure time stages.)

With the circuit arrangement it is also possible for an automatic diaphragm setting to take place, if in place of the time control circuit in FIG. 2 the diaphragm control circuit in FIG. 3 is connected to point A of the circuit arrangement in FIG. 1. If a positive potential occurs on one of the decoder outputs of FIG. 1, a current will flow by way of the corresponding resistance path and the resistor 32 of FIG. 3. The voltage drop occurring on the resistor 32 is fed to a comparator 28 and compared with the voltage drop on a potentiometer actuated by the diaphragm drive. If there is a voltage difference between these two values, the diaphragm drive 29 will vary and thus displace the potentiometer 31 until the voltage difference at the input of the comparator is zero. In the case of specific output combinations on the counter 14, again two adjacent decoder outputs will alternately conduct positive potential. The voltage fluctuations on the resistor 32 then occurring are averaged by the capacitor 33, so that with this circuit again with eight resistance paths in the resistance network 19 it is possible to set fifteen different diaphragm stages.

The individual set exposure times or diaphragm apertures can be indicated in a simple manner by connecting a luminous diode with each decoder output. Each luminous diode is allocated in each case to every second successive time or diaphragm stage. The diaphragm or exposure time stages lying therebetween, which are formed when two decoder outputs display positive signal alternately, are indicated by the lighting up of two adjacent luminous diodes.

Figure 4:
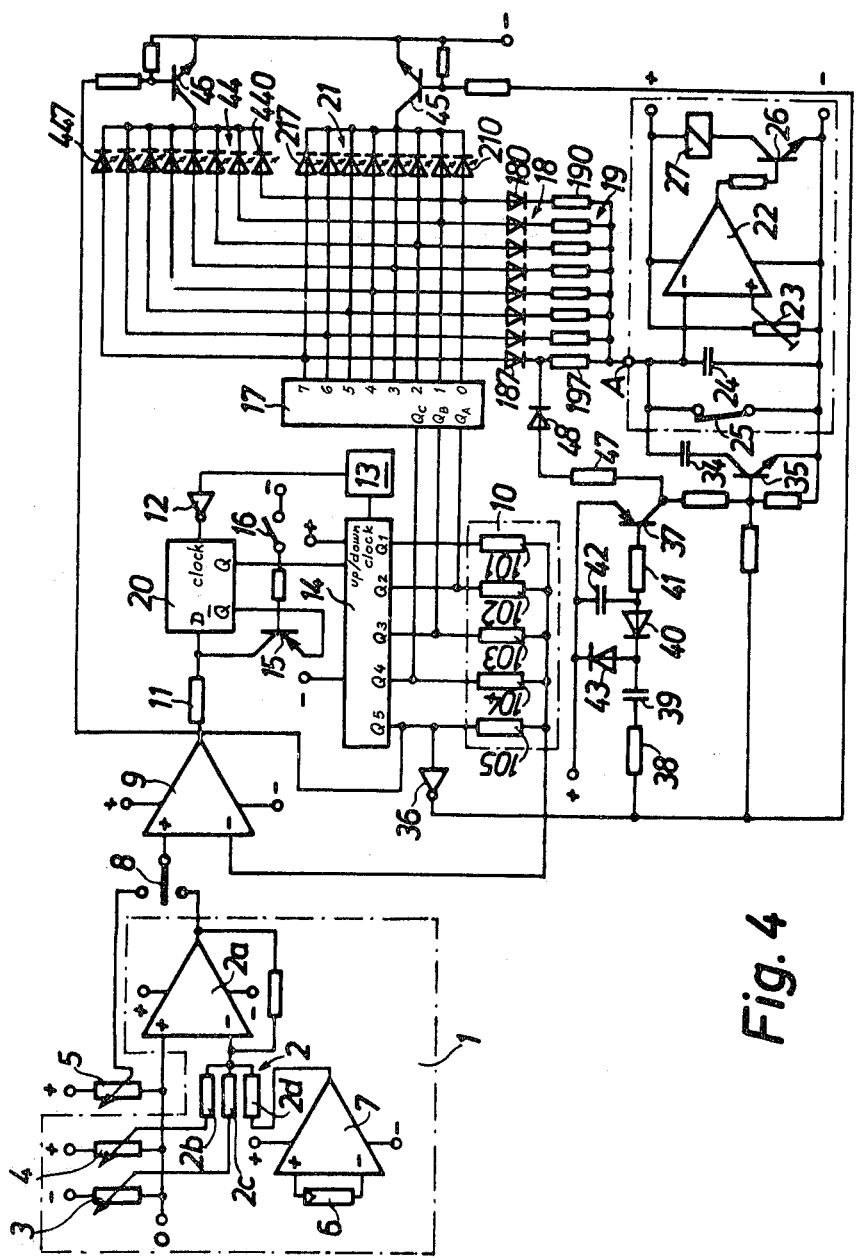
FIG. 4 is a schematic circuit diagram similar in general to FIG. 1, illustrating a modification of the invention for increasing the number of settable exposure value stages.

In FIG. 4 the circuit arrangement is extended by further measures of inexpensive circuitry to the effect that the number of settable exposure time stages is doubled and thus a still more exact exposure time formation becomes possible. From the same decoder 17 and the same resistance network 19 as in FIG. 1, the circuitry of FIG. 4 can form twice the number of exposure times. In the present case with eight decoder outputs, 32 different exposure time stages can be formed, instead of only sixteen as in FIG. 1. For this purpose the up/down counter 14 is extended by one further output, so that it now constitutes an $n + 1$ bit counter. The $n + 1$ bit output, in the present example $Q_5$, is likewise connected through a resistor 105 with the connection point of the other counter outputs $Q_1$ to $Q_4$. The series connection of a further integration capacitor 34 and of an npn-transistor 35 is connected in parallel with the integration capacitor 24. The output $Q_5$ of the counter 14, extended by one bit, is connected through an inverter 36 with the base of the transistor 35. As long as the $Q_5$ output has "0" signal, which is the case during the passage of the counter in the zone corresponding to longer times, the transistor 35 is conductive and the integration capacitor 34 is connected in parallel with the integration capacitor 24. The ratio of the capacitances of the parallel connection of integration capacitor 34 and integration capacitor 24 to the capacitance of the integration capacitor 24 is selected as $2^8:1$.

Here again the second time stages in each case are formed in that the charge current for the capacitor 24 or capacitors 24 and 34 flows half of the time each through the one and the adjacent resistance path of adjacent decoder outputs. Admittedly the change from the eighth to the ninth exposure time stage, where thus the counter outputs $Q_4$ and $Q_5$ alternately conduct positive signal and correspondingly charge current flows alternately through the resistors 197 and 190, cannot be formed in this way, since in each case a quite low resistance path and a very high resistance path are switched on alternately. For this case a further circuitry measure is provided which keeps the transistor 35 conductive.

For this purpose a pnp-transistor 37 is connected with its emitter to positive potential and with its collector to the base of the transistor 35. The output of the inverter 36 is connected through a resistor 38, a capacitor 39, an oppositely polarized blocking diode 40, and a resistor 41 to the base of this transistor 37. The emitter of the transistor 37 is connected through a capacitor 42 with the anode of the blocking diode 40 and through an oppositely polarized diode 42 with the cathode of the blocking diode 40. As long as the $Q_5$ output of the counter has an alternating signal, the transistor 37 and thus the transistor 35 are conductive and the integration capacitor 34 is connected in parallel with the integration capacitor 24. Through the resistor 47 with the transistor 37 conductive, a correction current flowing through the resistor 197 is also introduced into the charging operation of the parallel-connected capacitors 24 and 34. The blocking didode 48 prevents actuation of the transistor 35 through the output of the decoder 17.

These thirty-two different exposure time stages can likewise be indicated exactly without difficulty, in that a further luminous diode line 44 consisting of eight luminous diodes is provided, whose luminous diodes 440 to 447 are each connected with one of the decoder outputs. The anodes of the luminous diodes 210 to 217 are connected through an npn-transistor 45, and the cathodes of the luminous diodes 440 to 447 are connected through an npn-transistor 46, with the negative potential. The $Q_5$ output of the counter 14 actuates the base of the transistor 46 directly and the base of the transistor 45 through the inverter 36. In this way in conformity with the switching over of the effective integration capacitor, in the case of the longer exposure times which occur upon switching on of the two capacitors 34 and 24, the luminous didodes 210 to 217 are connected with negative potential and light up according to the actuation of the decoder outputs, and in the case of the shorter exposure times in which only the capacitor 24 is switched on, the luminous diodes 440 and 447 are connected with negative potential and light up according to the actuation of the decoder outputs.

It has been mentioned above that one of the features of the present invention is an arrangement for storage of electric signal values. This will now be discussed with reference to FIG. 1, which includes the circuitry for a first form of this storage feature of the invention, and FIG. 5, which illustrates the circuitry for a modification or second form of this part of the invention.

In FIG. 1, the comparator 9 has a non-inverting input which is occupied with the exposure value to be stored. This exposure value is formed automatically in the way already described above, or in any conventional or usual way in any known circuit arrangement for the formation of a photographic exposure value in dependence upon the subject brightness, the film sensitivity, and an introduced exposure value factor of either diaphragm aperture or exposure time. The inverting input of the comparator 9 is connected with the output of the digital-analog converter 10, from the output of which an analog signal can be tapped corresponding to the introduced digital combination. The digital-analog converter 10 is formed in the present example from four mutually parallel-connected resistors 101 to 104, each resistor being connected to an output of the 4-bit up/-down counter 14. The clock input of the up/down counter 14 is connected with the pulse generator 13, while the up/down input (up/down selector) of the counter is connected to the Q output of the D-flip-flop 20. This has been largely explained above in the earlier discussion of the circuitry of FIG. 1, but is now partly repeated here in connection with the more concentrated special discussion of the storage feature or aspect of the invention.

The D-flip-flop is operated with a timing sequence which is the converse of the timing sequence of the up/down counter 14, which is achieved by connecting the pulse generator 13 through an inverter 12 with the clock input of the D-flip-flop. The output of the comparator 9 is connected through a resistor 11 with the D-input of the flip-flop, which in turn can be connected through a switch with the Q-output of the D-flip-flop. This switch is formed in FIG. 1 as pnp-transistor 15, the base of which is connectable through a mechanically closable switch 16 to negative potential, whereby the transistor 15 becomes conductive and connects the Q-output of the D-flip-flop directly with the D-input. The switch 16 can be closed by the swinging up movement of the mirror into its picture-taking position, in a single lens mirror reflex camera, or it can be actuated, as previously mentioned, for the execution of a counter-light exposure by a key (not shown) called the "memo" key.

The operation of this circuit arrangement for signal storage purposes is as follows:

By reference to the measured subject brightness, in dependence upon the set film sensitivity and the predetermined diaphragm aperture (automatic timer) or the predetermined exposure time (automatic diaphragm), the requisite exposure value is ascertained in the circuit arrangement 1 for the formation of the exposure value and is fed to the non-inverting input of the comparator 9. The timing pulses from the pulse generator 13 arrive at the clock input of the up/down counter 14. Each positive flank of these pulses steps the counter 14 further by one counting stage. Through the resistors 101 to 104, whose resistance value is in inverse proportion to the value of the respective output, rectangular signals are formed which are brought together at the connection point of the resistors, which is at the same time the output of the digital-analog converter 10. Thus with the counter running continuously at this connection point there occurs a $2^4$-stage staircase voltage (in the case of an $n$-bit counter correspondingly a $2^n$-stage voltage). The comparator 9 compares the analog staircase signal at the connection point of the resistors with the exposure value signal at the non-inverting input. The output signal of the comparator 9 arrives at the D-input of the flip-flop 20, whose timing signal as described is the converse of the timing signal of the counter 14. With the positive flank of the converse timing pulse, that is with the negative flank of the timing pulse of the pulse generator 13, the Q-output takes over the information of the D-output.

As long as the analog staircase signal and the exposure value signal present on the non-inverting input of the comparator 9 are different, the output of the comparator and thus the Q-output of the flip-flop 20 do not change. The counter 14 retains its counting direction, that is to say it counts up or down, that is it adds or subtracts. If the signal at the inverting input of the comparator 9 is less than at the non-inverting output, the counter initially counts upwards, that is it adds. If now the analog staircase signal exceeds the exposure value signal, the output of the operation amplifier 9 becomes negative which takes place with foward stepping of the counter, that is with the positive flank of the timing pulse. With the negative flank of this timing pluse the Q-output of the D-flip-flop 20 takes over the information of the comparator output and switches the counter to "down". The next timing pulse is then counted downwards by the counter 14, that is subtracted, whereby the analog staircase signal again becomes smaller than the electric exposure value signal at the non-inverting input of the comparator 9. Thus the output of the comparator again becomes positive, the information is taken over by the Q-output of the flip-flop 20 and the latter through the up/down input switches the counter to "up," so that the next pulse is again added. Thus the counter 14 alternates constantly between these two positions and the output voltage of the digital-analog converter 10, thus laternating between two values, is a measure for the exposure value ascertained by the circuit arrangement 1.

If now this value is to be stored, the switch 16 is closed, whether by actuation of the release knob and the swinging movement of the camera mirror involved therewith, or whether by pressing of the described memo key. With closure of the switch 16 the base of the pnp-transistor 15 is connected to negative potential, so that the transistor becomes conductive. Thus the Q-output, which always conducts the converse signal of the Q-output, is connected directly with the D-input of the flip-flop 20. By this connection the signal arriving from the comparator output through the resistor 11 at the D-input of the flip-flop is over-ridden with the signal of the Q-output of the D-flip-flop, so that the first signal is ineffective. Since the signal at the Q-output is impressed upon the D-input and the Q-output with the negative flank of the timing pulse coming from the timing generator takes over the information of the the D-input, the signal at the Q-output of the D-flip-flop alternates constantly between high and low. Thus the alternating condition which the up/down selector of the counter 14 assumed at balance, that is in the case of presence of the exposure value signal at the comparator 9 at the moment of closure of the switch 16, is maintained, even if the exposure value signal at the non-inverting input of the comparator 9 should vary. At the output of the digital-analog converter 10 the analog signal can be obtained which the circuit arrangement 1 for the formation of the exposure value has notified to the comparator 9 at the moment of closure of the switch 16. This signal can be tapped as long as the switch 16 is kept closed. Of course it is also possible to tap a corresponding digital combination, which corresponds to the analog signal at the output of 10, directly from the $Q_1$ to $Q_4$ counter outputs of the counter 14. As soon as the switch 16 is opened, the storage operation is cancelled and the initially described operation is repeated, and the circuit arrangement balances itself afresh if necessary in the case of variation of the exposure value signal at the non-inverting input of the comparator 9.

Figure 5:
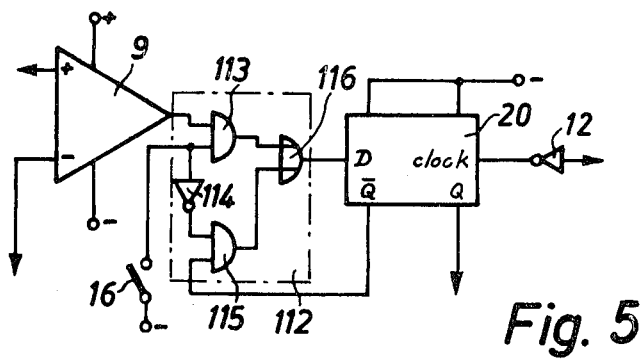
FIG. 5 is a schematic circuit diagram illustrating a modified form of certain switching means associated with a flip-flop device shown in FIGS. 1 and 4.

In FIG. 5 there is illustrated a variant of the switch formed by the transistor 15 in FIG. 1, between the D-input and the Q-input of the D-flip-flop 20. The switch is here formed as a logic circuit 112. The output of the comparator 9 is here connected with one input of an AND gate 113, the other input of which is connected to the switch 16. Moreover the latter input is also connected through an inverter 114 with one input of a second AND gate 115, the other input of which is connected with the Q-output of the D-flip-flop 20. The outputs of the first and second AND gates 113 and 115 are fed to an OR gate 116, the output of which is connected with the D-input of the flip-flop 20. The symbols used in FIG. 5 for the logic gates are the symbols customarily used in Europe, slightly different from the symbols customarily used in America, but well understood by those skilled in logic circuitry. Those not already familiar with such symbols will find the uropean and American symbols correlated and fully explained in FIG. 10 (sheet 8) of the drawings of Strauss and Koller U.S. Pat. No. 3,842,587.

If the switch 16 is opened the output of the AND gate 115 always has L-signal, as also does the input of the OR gate 116. Thus the signal present on the comparator 9 always passes unchanged to the D-input of the flip-flop 20.

If the switch is closed, the output of the AND gate 113 always has L-signal, as also does one input of the OR gate 116. Thus the signal present on the Q-output of the flip-flop 20 always passes unchanged to the D-input of the flip-flop 20.

Since this signal is always converse to the signal at the Q-output, and since the Q-output with the negative flank of the timing pulse coming from the timing generator 13 always takes over the signal of the D-input, the D-input of the flip-flop 20, as described above, alternately receives H and L signals. Likewise the signal at the Q-output of the flip-flop 20 and thus the signal at the up/down counter of the counter 14 alternate, so that again in this case with closure of the switch 16 the above described storage operation can be carried out.

Figure 6:
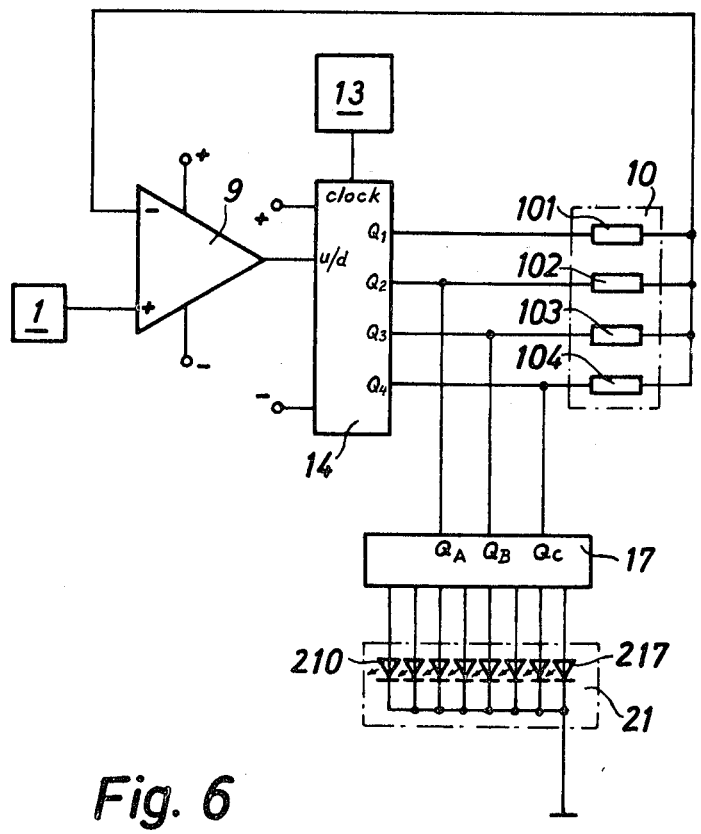
FIG. 6 is a schematic wiring diagram similar to part of FIG. 1, illustrating a modification.

It has been mentioned above that one part of the present invention relates to an exposure indicating device. One embodiment of the circuitry for such a device has already been described in connection with FIG. 1. A somewhat different embodiment of circuity for the indicating device is shown in FIG. 6, in order to illustrate that the indicating device has a broader application and does not necessarily require all of the circuit parts shown in FIG. 1. For ease of comparison, the parts in FIG. 6 are designated by the same reference numerals used for corresponding parts in FIG. 1, and it will be observed that the differences in FIG. 6 as compared with FIG. 1 are in the omission of some of the parts shown in FIG. 1, rather than in additional parts.

Referring now to FIg. 6, a comparator 9 has a non-inverting input connected with a circuit arrangement 1 which ascertains from the measured subject brightness, from the introduced firm sensitivity and from the introduced exposure time, the diaphragm stop necessary for the optimum exposure (automatic diaphragm), or which on the basis of the measured subject brightness, the introduced film sensitivity and the introduced diaphragm stop ascertains the exposure time necessary for an optimum exposure (automatic timer). The circuit 1 for producing this signal for the comparator 9 can be of the form shown at 1 in FIG. 1, or can be of any conventional known form. Naturally this non-inverting input of the comparator 9 can equally well be connected directly to an electric setting member for the diaphragm stop or the exposure time, according to whether the exposure control circuit is used for the setting of the diaphragm stop or for the setting of the exposure time.

The inverting input of the comparator 9 is connected with the output of a digital-analog converter 10. This digital-analog converter consists of $n$ mutually parallel-connected resistors, in the present case with $n = 4$, of the resistors 101 to 104. Each resistor is connected with one of the outputs $Q_1$ to $Q_n$ (in the case of $n = 4$, then $Q_n = Q_4$) of an up/down counter 14. The common connection point of the resistors forms the output of the analog digital converter and, as already mentioned, is connected with the inverting input of the comparator 9.

The up/down counter 14 is actuated by a pulse generator or timing generator 13 which continuously charges the clock input of the counter with a sequence of timing signals.

A decoder 17 is connected to the outputs of the counter 14 in such a way that the first bit output of the counter remains free. In the present case with a 4-bit counter a 3 to 8 decoder is necessary, the three inputs $Q_A$ to $Q_C$ of which are connected with the counter outputs $Q_2$ to $Q_4$. In the case of an $n$-bit counter correspondingly an $n$-1 to $2^{n-1}$ decoder would be necessary. Each output of the decoder is connected with the anode of a luminous diode 210 to 217, the cathode of which is connected to zero or negative potential. The luminous diodes are assembled into what is called a luminous diode line 21. It may be noted here that these parts described in connection with FIG. 6 are all present in FIG. 1, but some of the parts in FIG. 1 are omitted in FIG. 6, the output of the comparator 9 being connected directly to the input of the counter 14, rather than being connected through the flip-flop 20 as in FIG. 1.

The manner of operation of the indicator device will now be described with special reference to FIG. 6. The form shown in FIG. 1 operates similarly.

The automatically ascertained or manually introduced exposure parameter, whether the exposure time (Shutter speed) or the diaphragm aperture is to be set, is present as an exposure value signal at the non-inverting input of the comparator 9. The timing pulses of the pulse generator 13 arrive at the clock input of the up-/down counter 14. Each positive flank of these pluses steps the counter 14 further by one counting stage. Through the resistors 101 to 104, whose resistance value is in inverse proportion to the value of the respective output, rectangular signals are formed which are brought together at the connection point of the resistors. With the counter running continuously, at this connection point there occurs a staircase voltage of $2^n$ stages, that is in the present example, with four counter outputs, a 16-stage staircase voltage. The comparator 9 compares the analog staircase signal at the output of the digital-analog converter 10, that is at the connection point of the resistors 101 to 104, with the exposure value signal present on the non-inverting input of the comparator. The output signal of the comparator 9 arrives at the up/down input (up/down selector) $u/d$ of the counter 14.

As long as the analog staircase signal and the exposure value signal present on the non-inverting input of the comparator 9 are different, the output of the comparator 9 does not change. The counter 14 retains its counting direction, that is it counts upward or downward, to add or subtract. Let it be assumed that the counting direction is initially upward, that is adding, which means that the signal at the inverting input of the comparator is smaller than that at the non-inverting input. If now the analog staircase signal exceeds the exposure value signal, then the output of the comparator 9 becomes negative and the counter switches to "down." The next timing pulse arriving from the pulse generator 13 at the counter is counted downward, that is to say subtracted, whereby the analog staircase signal again becomes smaller than the electric exposure value signal. The output of the comparator 9 again becomes positive and the counter switches to "up", so that the next pulse is added again. Thus the counter alternates constantly between these two positions and the output voltage of the digital-analog converter, which thus alternates between two values, is a measure for the exposure value signal present on the non-inverting input of the comparator.

The binary combination at the outputs of the counter 14 for this analog staircase signal representative of the exposure value signal is now passed through the decoder 17 to the eight-position luminous diode line (LED line) 21. Since the counter, as described above, in the balanced state constantly counts once upward and once downward, the counter will constantly alternate between two binary combinations. Since the first bit of the counter is not also decoded, this alternation has no influence upon the decoder when only the first bit in the binary combination changes. This is the case at every second one of the possible 16 binary combinations, which corresponds to every second exposure value stage. In this case correspondingly to the binary combination from the 2nd, 3rd and 4th bit present on the decoder, one of the luminous diodes 210 to 217 in the luminous diode line 21 will light up. If however the 2nd, 3rd or 4th bit changes in the combination, with the alternation of the counter the binary combination arriving at the decoder inputs will also constantly change. Thus in alternation two different binary combinations are present on the decoder, and correspondingly two luminous diodes are actuated in alternation. Since this alternation of the counter takes place so rapidly that the eye cannot follow the change, the observer sees two luminous diodes, lying side by side, light up at the same time. This too is the case in every second exposure value stage between two indicated by a luminous diode, so that as a whole the succeeding exposure value stages are indicated in that first the outermost or first luminous diode of the luminous diode line 21 lights up, at the next exposure value stage the two outermost (1st and 2nd) light up, at the next exposure value stage the 2nd luminous diode alone lights, at the third exposure value stage the 2nd and the 3rd luminous diodes both light, and so forth. With the eight luminous diodes thus it is possible to indicate 15 different exposure value stages, whether they are exposure time (shutter speed) or diaphragm stop (aperture) stages.

A diagram of the binary combination allocated to the respective luminous diode is represented below. Here on the left the possible binary combinations are the outputs $Q_1$ to $Q_4$ of the counters are represented, and on the right the luminous diodes lighting up for these combinations are associated. In the usual way H designates High signal and L designates Low signal.

| $Q_1$ | $Q_2$ | $Q_3$ | $Q_4$ | | |
|---|---|---|---|---|---|
| L | L | L | L | → | LED 210 |
| L | L | L | H | → | LED 210 + 211 |
| L | L | H | L | → | LED 211 |
| L | L | H | H | → | LED 211 + 212 |
| L | H | L | L | → | LED 212 |
| L | H | L | H | → | LED 212 + 213 |
| L | H | H | L | → | LED 213 |
| L | H | H | H | → | LED 213 + 214 |
| H | L | L | L | → | LED 214 |
| H | L | L | H | → | LED 214 + 215 |
| H | L | H | L | → | LED 215 |
| H | L | H | H | → | LED 215 + 216 |
| H | H | L | L | → | LED 216 |
| H | H | L | H | → | LED 216 + 217 |
| H | H | H | L | → | LED 217 |
| H | H | H | H | | |

What is claimed is:

1. Photographic camera control mechanism for producing a control output signal useful for controlling one of the two exposure factors of exposure time and diaphragm aperture, said control mechanism comprising
   (a) electronic circuit means for generating a first analog signal responsive to subject brightness, film sensitivity, and an exposure factor other than one to be controlled by said control output signal,
   (b) a reversible $n$-bit counter,
   (c) a digital-analog converter having a plurality of inputs from a plurality of outputs of said counter and effective to generate a second analog signal,
   (d) means for comparing said first analog signal with said second analog signal,
   (e) means for stepping said counter forward step by step in a first counting direction when the second analog signal is smaller than the first and in an opposite counting direction when the second analog signal is greater than the first,
   (f) a decoder having a plurality of inputs respectively connected to all but one of said plurality of outputs of said counter, said counter having a first bit output which is not connected to said decoder,
   (g) said decoder being formed as an $n$-1 to $2^{n-1}$ decoder, and having $2^{n-1}$ outputs, wherein $n$ represents the number of bits to be considered,
   (h) a plurality of resistors whose resistance values are graduated in a specific ratio to one another,
   (i) said resistors having inputs each respectively connected to one of the respective outputs of said decoder, and
   (j) means connecting outputs of all of said resistors to a common connection point at which said control output signal is present.

2. The invention of claim 1, further comprising a timing pulse generator, means connecting an output of said pulse generator to a timing input of said counter, and means connecting an output of said comparing meens to an up/down input of said counter.

3. The invention of claim 2, characterized by an optionally connectable device for over-riding the up/down input of said counter (14) with an alternating signal which constantly reverses the counting direction of the counter.

4. The invention of claim 3, wherein said over-riding device comprises a D-flip-flop (20) having a Q-output connected to the up/down input of the counter and having a Q-output is connected through switch means (15) with a D-input of said flip-flop, said D-input being also connected to the output of said comparing means.

5. The invention of claim 1, wherein said digital-analog converter (10) comprises a plurality of resistors (101-104) connected with one input of said comparing means (9), the resistance values of said resistors being graduated in a specific ratio to one another, one resistor in each case being connected with one output of the said counter (14).

6. The invention of claim 1, further comprising a plurality of luminous diodes (210-217) arranged in a luminous diode line (21), each luminous diode being connected to one respective output of said decoder.

7. The invention of claim 1, wherein the control mechanism controls a closure movement of a camera shutter, further comprising an automatic exposure time-control system responsive to said control output signal and including an integration capacitor (24), a threshold value switch connected to said capacitor, and a magnet (27) controlling release of a closure movement of a camera shutter, said magnet being connected to said threshold value switch.

8. The invention of claim 7, wherein said threshold value switch comprises a comparator (22) having one input connected with said integration capacitor (24), a reference resistor (23) connected with another input of said comparator, a transistor (26) in series with said magnet (27), and a connection from an output of said comparator to the base of said transistor.

9. The invention of claim 5, wherein said counter (14) comprises a further output ($Q_5$) for an $n+1$ bit, a series connection of a transistor (35) and a second integration capacitor (34), said series connection being connected in parallel with said first integration capacitor (24), and a connection from said further output ($Q_5$) to an input of said converter (10) and to the base of said transistor (35).

10. The invention of claim 9, wherein said further output ($Q_5$) of said counter (14) is connected through a resistor (105) to the comparing means input connected with other resistors (101-104).

11. The invention of claim 9, further comprising circuit means to keep said transistor (35) conductive in the case of an alternating signal on the further counter output ($Q_5$).

12. The invention of claim 11, further comprising a further transistor (37) having an emitter-collector path connecting the base of the first transistor (35) with a plus potential and having a base connected through a blocking diode (40), a capacitor (39), and an inverter (36) with said further output ($Q_5$) of the counter (14), the emitter and base of said further transistor (37) being connected with one another through a further capacitor (42), the anode of said blocking diode (40) being connected through a further diode (43) with said plus potential.

13. The invention of claim 12, wherein the collector of the first transistor (37) is connected through a resistor (47) and a diode (48) to the resistor (197) which is connected with the $2^{n-1}$th output of the decoder (17).

14. The invention of claim 6, further comprising a second luminous diode line (44) having luminous diodes (440–447) each connected respectively with a decoder output, means connecting outputs of each of said first and second luminous diode lines (21, 44) with negative potential through respective transistors (45, 46), means connecting the base of the transistor (45) controlling the first luminous diode line (21) through an inverter (36) to a further counter output ($Q_5$), and means connecting the base of the transistor (46) controlling the second luminous diode line (44) directly to said further counter output ($Q_5$).

15. The invention of claim 1, further comprising storage means for storing said first one of said analog signals, said storage means comprising means for over-riding an input to said counter stepping means with an alternating signal which effects a constant changeover of the counting direction of said counter.

16. The invention of claim 15, wherein said over-riding means comprises a D-flip-flop (20) having a Q output connected with an up/down input of said counter (14) and a Q output connected through a switch to a D input of said flip-flop, said D input being connected also to an output of said comparing means.

17. The invention of claim 16, wherein said switch is formed as a linkage of logic gates (112).

18. The invention of claim 16, wherein said switch is formed as a transistor (15) having a base selectively connectable to a signal lead (16).

19. Storage means for storing an electric signal of analog form, comprising
  (a) electronic circuit means for generating a first analog signal,
  (b) a reversible pulse counter capable of producing a digital output signal
  (c) means including a digital-analog converter operatively connected to said counter and effective to generate a further analog signal,
  (d) means for comparing said first analog signal with said further analog signal,
  (e) means for stepping said counter forward step by step in a first counting direction when the further analog signal is smaller than the first and in an opposite counting direction when the further analog signal is greater than the first,
  (f) means for over-riding a counter input connected to said counter stepping means with an alternating signal which effects a constant changeover of the counting direction of said counter, and
  (g) means for rendering said over-riding means operative when and so long as it is desired to store said first analog signal.

20. The invention of claim 19, further comprising a pulse generator (13) connected to a clock input of said pulse counter (14), said counter also having an up/down input connected to an output of said comparing means.

21. The invention of claim 20, wherein said over-riding means is connected between the output of said comparing means and said up/down input of said counter.

22. The invention of claim 21, wherein said over-riding means comprises a D-flip-flop (20) having a Q-output connected with the up/down input of the counter and having a Q-output connected for the duration of the storage operation through a switch with a D-input of said flip-flop, said D-input being connected also to the output of said comparing means.

23. The invention of claim 22, wherein said switch is formed as a linkage of logic gates (112).

24. The invention of claim 23, wherein an output of said comparing means is connected to one input of a first AND-gate (113) the other input of which is connected with a voluntarily occupable signal lead (16) and through an inverter (114) with an input of a second AND-gate (115), another input of which is connected to a Q-output of said D-flip-flop (20) the two ouputs of the two AND-gates being connected through an OR-gate (116) with said D-input of the D-flip-flop (20).

25. The invention of claim 22, wherein said switch is formed as transistor (15), the base of which is connected to a voluntarily occupable signal lead (16).

26. The invention of claim 25, further comprising a resistor (11) connected between the output of said comparing means and the D-input of said flip-flop (20).

27. The invention of claim 22, wherein said D-flip-flop (20) has a clock input which is connected with said pulse generator (13) through an inverter (12).

28. The invention of claim 19 wherein said digital-analog converter (10) comprises a plurality of resistors (101–104) connected in parallel with one another and each connected with a counter output ($Q_1$ to $Q_4$) of the pulse counter (14) and having a common connection point connected to one input of the comparing means (9) another input of which is occupied with the first analog signal, the resistance values of the resistors being graduated in progressive sequence in a specific ratio to one another.

29. Photographic camera control mechanism for producing a control output signal useful for controlling one of the two exposure factors of exposure time and diaphragm aperture, and control mechanism comprising
  (a) electronic circuit means for generating a first analog signal responsive to subject brightness, film sensitivity, and an exposure factor other than one to be controlled by said control outut signal,
  (b) a reversible n-bit counter,
  (c) a digital-analog converter having a plurality of inputs from a plurality of outputs of said counter and effective to generate a second analog signal,
  (d) means for comparing said first analog signal with said second analog signal,
  (e) means for stepping said counter forward step by step in a first counting direction when the second analog signal is smaller than the first and in an opposite counting direction when the second analog signal is greater than the first,
  (f) a decoder having a plurality of inputs respectively connected to all but one of said plurality of outputs of said counter, said counter having an first bit output which is not connected to said decoder,
  (g) said decoder being formed as an $n-1$ to $2^{n-1}$ decoder, and having $2^{n-1}$ outputs, wherein $n$ represents the number of bits to be considered, and
  (h) a plurality of luminous diodes arranged in a luminous diode line (21), and
  (i) circuit means respectively connecting each luminous diode to one of said outputs of said decoder.

30. The invention of claim 29, wherein said luminous diode line is arranged in the viewfinder of a camera.

31. The invention of claim 29, further comprising means for lighting a first luminous diode to indicate one exposure value, lighting a second luminous diode adjacent to said first diode to indicate another exposure value, and lighting both said first and second diodes to indicate an exposure value intermediate between the respective exposure values indicated by lighting either of said first and second luminous diodes alone.

32. The invention of claim 29, wherein said pulse counter (14) has a timing input connected to a timing generator (13) and an input (u/d) for determining the counting direction of the counter, said last mentioned input being connected with the output of said comparing means (9).

33. The invention of claim 32, wherein one input of said comparing means (9) is occupied by the second analog signal coming from said digital-analog converter (10) and another input thereof is occupied with the first analog signal representing the exposure value signal, and the output of said comparing means is connected to the input (u/d) determining the counting direction of the pulse counter (14).

34. The invention of claim 32, wherein said digital-analog converter (10) comprises mutually parallel-connected resistors (101-104) having a common connection point connected with the input of said comparing means (9), the resistance values of said resistors being graduated in progressive sequence in a specific ratio to one another.

* * * * *